No. 793,299. PATENTED JUNE 27, 1905.
E. H. JEWETT.
METHOD OF FORMING GLASS ARTICLES IN MOLDS.
APPLICATION FILED JAN. 23, 1903.
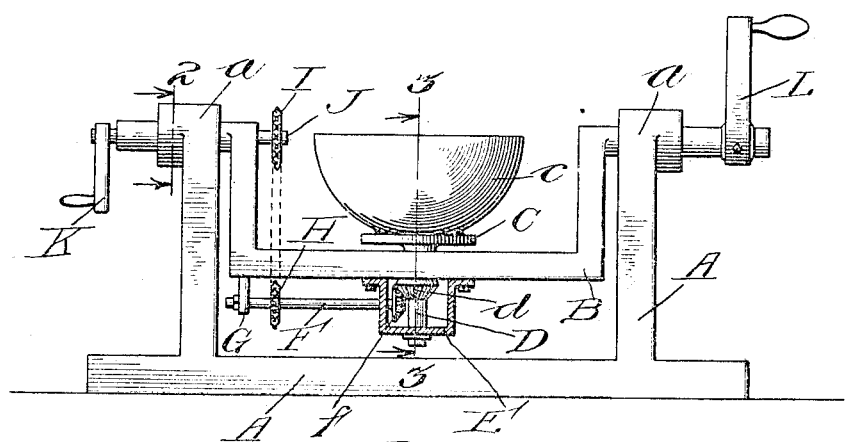
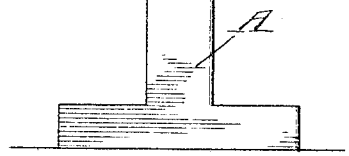
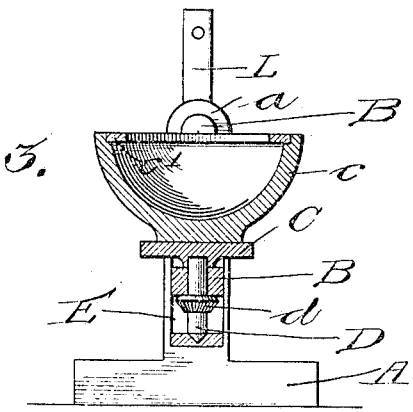
Witnesses:
Inventor
Edwin H. Jewett.
by Raymond Barnett
his Attorneys No. 793,299.

Patented June 27, 1905.

UNITED STATES PATENT OFFICE.

EDWIN HALE JEWETT, OF TOLEDO, OHIO, ASSIGNOR TO THE LIBBEY GLASS COMPANY, OF TOLEDO, OHIO, A CORPORATION OF OHIO.

METHOD OF FORMING GLASS ARTICLES IN MOLDS.

SPECIFICATION forming part of Letters Patent No. 793,299, dated June 27, 1905.

Application filed January 23, 1903. Serial No. 140,199.

*To all whom it may concern:*

Be it known that I, EDWIN HALE JEWETT, a citizen of the United States, residing at Toledo, in the county of Lucas and State of Ohio, have invented certain new and useful Improvements in Methods of Forming Glass Articles in Molds, of which the following is a specification.

The object of my invention is to provide a new and useful method of forming glass articles in molds.

So far as I am advised, it has been the uniform practice heretofore to mold glass articles either by forcing the glass while in a liquid or plastic state into molds by means of a plunger or by blowing the glass into molds or by a combination of molding and blowing. By my process, however, the glass is effectively forced into the mold, and the glass is evenly distributed in the mold by means of centrifugal force, whereby I avoid hardening the glass by pressure, which occurs when a plunger is used. I avoid superficially chilling the glass, as when a plunger is used. I induce the glass to flow naturally into the mold, so that the internal strains in the glass are automatically adjusted. I dispense with the skilled labor necessary when the glass is molded by blowing. I obtain an even distribution of material, and I obtain a uniformly smooth surface for the interior of the molded article.

My process is, among other things, adaptable for the forming of blanks for articles of cut glass particularly, because by avoiding the superficial chill and consequent surface hardness of the glass I render easier the process of cutting, and I also obtain an article of uniform toughness throughout.

These and such other objects as may hereinafter appear are attained by the practice of my process as hereinafter described.

For purposes of illustration I have shown in the drawings a machine with which my process may be practiced.

In the drawings, Figure 1 indicates an elevation of a machine suitable for practicing my invention. Fig. 2 is a sectional view on the line 2 2 of Fig. 1 looking in the direction indicated by the arrows. Fig. 3 is a like view on the line 3 3 of Fig. 1.

Referring to the accompanying drawings, 1 is a base supplied with standard A, carrying bearings $a$, within which is journaled a double crank B. Pivotally mounted upon the double crank B is a support C, which carries a mold $c$. The support C is securely attached to a pivot D, which is journaled within the crank B and has another bearing within or upon a bracket E. The pivot D is provided with a bevel-gear $d$, which meshes with the gear $f$ upon a shaft F, said shaft being journaled at one end within the bracket E and at the other end within a bracket G, which is carried by the double crank B. The shaft F is provided with a sprocket-wheel H, keyed thereto, and which is connected, by means of a chain $h$, to a sprocket-wheel I, which is keyed to a shaft J. The shaft J is journaled within one of the bearing-arms of the double crank B and is provided with an operating-crank K. The double crank B is provided with an operating-crank L.

With an apparatus so constructed my process will be practiced as follows: Any suitable mold $c$ being attached to the support C a measured quantity of sufficiently fluid glass is emptied into the mold and the shaft J is rotated in any suitable manner, thereby causing the platform C, and with it the mold $c$, to rotate rapidly upon the axis of the pivot D, whereupon centrifugal force will cause the liquid glass to flow upwardly along the walls of the mold $c$ until it comes in contact with the annular shoulder $c'$. The tendency of this centrifugal force will be to draw the liquid glass entirely away from the bottom of the mold, so that it is possible to thereby produce molded glass articles having openings through their bottoms; but the speed of rotation can be so regulated that this result need not follow. If it be desired to keep a greater quantity of the glass at the bottom of the mold or to produce more elongated articles in proportion to their width, the double crank B will also be caused to rotate, carrying with it bodily the mold $c$, the mold meantime rotating upon its own axis, the double centrifugal action resulting giving the desired distribution of glass within the mold.

By this process the glass is distributed by a substantially constant and even force, which gently forces the plastic or liquid glass into the mold and into any patterns which may be formed within the mold, but without any direct mechanical pressure upon the surface of the glass and without the superficial chilling and subsequent hardening and brittleness of the glass which results from forcing the mold into the glass with a plunger.

Obviously many other forms of machine may be devised for carrying out my process, and I do not limit myself to any specific form of machine, but claim broadly the process shown.

I claim—

The process of molding glass, which comprises supplying a mold with glass in a sufficiently liquid state, and spreading the glass within the mold by rotating the mold upon its axis, and simultaneously and continuously revolving the mold around another axis which passes across the mold substantially at its open end.

EDWIN HALE JEWETT.

Witnesses:
AUSTIN R. SEAGRAVE,
DOROTHY SEAGRAVE.